P. A. VOGT.
Refrigerator.
No. 2,346.
Reissued Aug. 28, 1866.
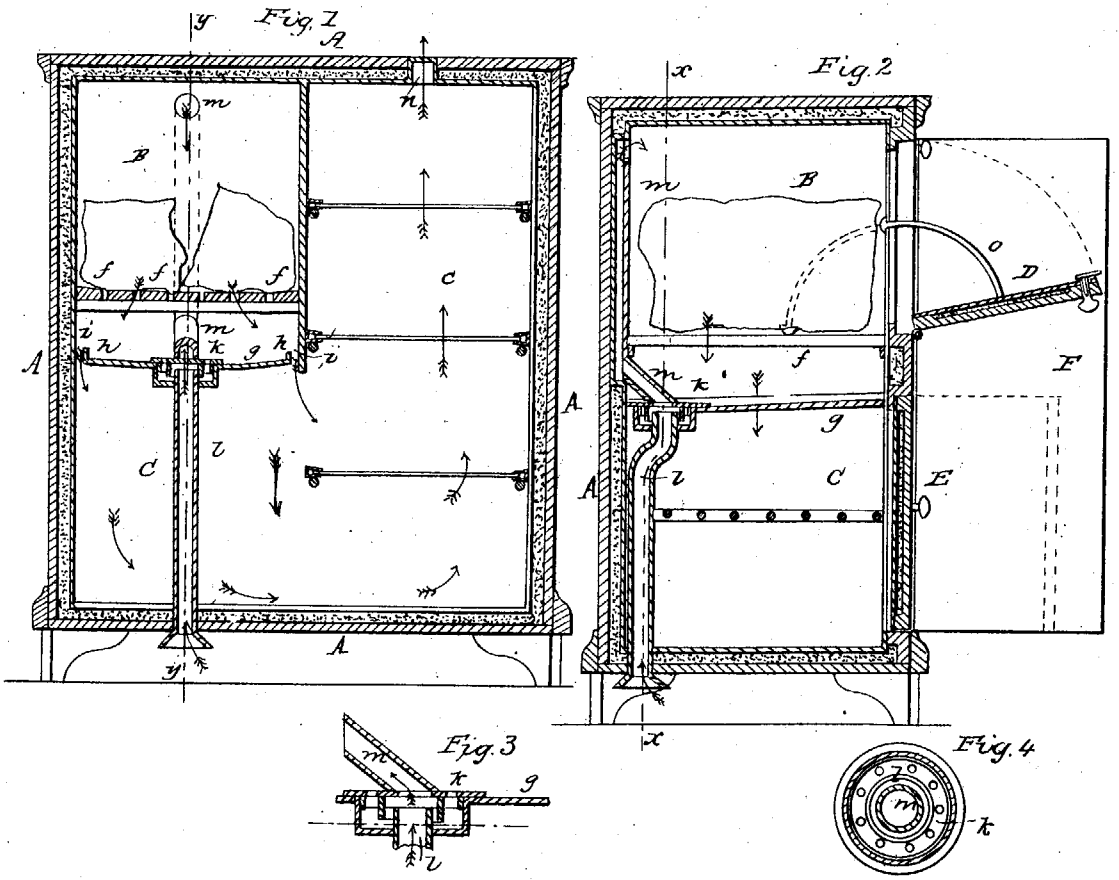
WITNESSES
Jay Hoyt.
Albert Wright
INVENTOR
Peter A. Vogt
by J. Mason Rear
attys
N. PETERS, Photo-Lithographer, Washington, D. C.

UNITED STATES PATENT OFFICE.

PETER A. VOGT, OF BUFFALO, NEW YORK.

IMPROVED REFRIGERATOR.

Specification forming part of Letters Patent No. 54,980, dated May 22, 1866; Reissue No. 2,346, dated August 28, 1866.

*To all whom it may concern:*

Be it known that I, PETER A. VOGT, of Buffalo, in the county of Erie and State of New York, have invented certain new and useful Improvements in Refrigerators; and I do hereby declare that the following is a full and exact description thereof, reference being had to the accompanying drawings, making part of this specification, in which—

Figure 1 is a vertical section on the line *x x* of Fig. 2. Fig. 2 is a vertical section on line *y y* of Fig. 1. Fig. 3 is a fragmentary section of the air-induction pipe *m* and trap *k*, for the escape of the water produced by the melting of the ice. Fig. 4 is a plan view of the same inverted.

Like letters designate corresponding parts in all the figures.

My invention has for its object securing a better circulation of air through the refrigerator and cooling the same before it is admitted into the ice-chamber by introducing it through the drip-pipe, where it is refrigerated by water that escapes from the ice-box, and discharging it at the top thereof, where, from the greater gravity produced by its low temperature, it immediately falls to the bottom, passing thereby through the whole perpendicular distance of the interior of the refrigerator and retraversing that space to escape, thereby economizing the ice and affording more perfect ventilation; and also to provide an easier method of introducing into the refrigerator the ice in a single block of a size nearly corresponding to that of the compartment for receiving it, and at the same time to facilitate access to the ice when in the chamber; and it consists in the arrangement and device for conducting the external air through the drip-pipe in contact with the water which melts from the ice, and thence into the ice-chamber; and also in the construction and arrangement of the door to the ice-chest at the front or side, so as to be turned down and form, in connection with the rack *f f* of the ice-compartment, an inclined way or platform nearly or quite on a level with the said rack, to enable large blocks of ice to be easily slid onto the latter without injury to the apparatus from its falling, as when introduced at the top.

As represented in the drawings, A A represent the exterior box or walls of my refrigerator, B being the ice-chamber, so placed as to leave a large space, C C, below and at one side for the reception of the articles to be preserved.

D is the door to the ice-box, and E is a small door below, and F a larger one by the side of the two, through which access is had to the food-chamber C C. The walls, top, and doors are made non-conducting in the usual manner, and the whole is lined with galvanized iron or other suitable non-corrosive metal.

The ice-chamber is formed with removable slats *f f*, having spaces between them for the passage of air and water, and a tight metallic bottom, *g*, each side of which is provided with upturned flanges *h h* to retain the drippings, and between which and the sides of the box spaces *i i* are left for the passage of the air into the chamber below, as indicated by the arrows. The bottom *g* is made concave and inclined toward the back side, where the discharge-trap *k* and pipe *l* receive and conduct the drippings from the ice through the chamber C. The pipe *l* terminates below the bottom of the refrigerator with a bell-shaped mouth, through which the air collects and ascends the pipe, (the space within which is only partially filled by the escaping water,) and, passing through the trap, continues to ascend by the extension-pipe *m* to the top of the air-chamber, which it enters through an induction-orifice, in which the pipe terminates. The trap *k* surrounds the lower end of pipe *m*, and is so constructed that the water escapes freely through it and descends the conduit, while it is impervious to the air which must follow up the continuation. To prevent the pipe *m* from being bruised or injured in filling the chamber with ice it is deflected aside into the interior of the wall before reaching the ice-rack, as shown most clearly in Fig. 2.

By this arrangement the air which fills the tube *l* is cooled by being exposed in its passage to contact with the drops of water, which are constantly dripping through the pipe at the temperature of melting ice, and with the sides of the metallic pipe, which are kept cold by the same means, so that it enters the ice-chamber in a condition of extremely low temperature. As it falls around the ice it is still further cooled, and its increased density causes it to descend to the bottom of the preserving-chamber C. As the air in this chamber has a tendency to become warmer than that which is thus entering through the ice-box, it is forced upward by the latter and crowded out of the orifice *n* in the top. Thus a current is kept up by the air ascending through the drip-pipe to enter, thence falling through the ice-box to the bottom, and again rising to the top in escaping, which effectually ventilates the refrigerator and keeps it constantly pure.

I am aware that air is introduced into the ice-chamber of many refrigerators at or near the top, which, becoming cooled by the ice, descends to the bottom; but in this case the air enters warm, and in parting with its caloric occasions the rapid and wasteful melting of the ice; but I am not aware of any instance in which the air introduced is elevated from below the refrigerator, where a cooler stratum always prevails, and refrigerated to a temperature nearly as low as the ice by its drippings, to prevent the too rapid melting thereof.

My arrangement also secures another advantage—that of preventing any counter-currents by which the air would escape through the induction-orifice, as sometimes occurs in others when the amount of ice is small, as it is obvious that no current of air could pass out of the refrigerator through the downward course of the pipes *m* and *l*.

It is desirable to have as large a capacity to the ice-box as possible, and important that it should be so constructed that it may receive a solid block of ice of nearly its full area. As the ice-box is necessarily at the top of the apparatus, and access to it is ordinarily had by raising a lid or cover, it becomes extremely difficult to get large blocks introduced, as tongs cannot be used at such an elevation, and the mass is so smooth and heavy that it is liable to slip from the hands and fall when raised so high. This liability to fall increases with the size of the blocks, the weight of which is sufficient in falling to frequently force off the cleats which support the bottom of the ice-box, thereby tearing holes in the metallic lining and admitting moisture to rot the wood, and sometimes so breaking the inner casing as to let the charcoal or other filling out into the food-chamber. To prevent these injurious results the ice is broken into smaller pieces, which occasions a great waste from its melting more rapidly.

To obviate these serious defects I construct my refrigerator with the top or cover permanently closed, and provide in the side of the ice-box (preferably in front) a door, D, hinged at the bottom on a line horizontal, or nearly so, with its rack *f f*, so as to fall outward, and provide it with suspension-braces *o* at each side, formed of the arc of a circle, which pass through the sides or jamb of the opening, as shown. These are of a suitable length to allow the door to fall only to a nearly horizontal position, or so far as to preserve a slight inclination toward the interior, as shown in Fig. 2, forming a platform or table on which the ice when laid upon its outer extremity can be easily pushed in its place on the rack *f f*, or if sufficiently inclined it will slide in of its own gravity, and by this means blocks that will nearly fill the chamber can be used with ease, as they can be guided so as to pass gently through the door into the ice-chamber without falling and injuring the interior.

This arrangement not only saves much labor and trouble and prevents great damage and loss, as above described, but the door by being turned down enables easy access to be had to the ice, and forms a convenient table or platform for withdrawing the latter upon for breaking off portions for the table or other uses, as required. This is an advantage of great importance when the compartment B is used as a magazine for storing the ice, as is usually the case, into which access is so frequently required for supplies for the various purposes of a household, and especially those used in saloons, restaurants, and like places.

What I claim as my invention, and desire to secure by Letters Patent, is—

1. The door D, constructed as described, combined and arranged with the rack *f f* of the ice-compartment, so as to turn down and form a platform in continuation thereof, for introducing and removing ice from the chamber B, substantially in the manner specified.

2. The arrangement of the induction air-passage through the drip-pipe *l* and extension-pipe *m*, in combination with the trap *k*, or its equivalent, whereby the air entering is carried to the top of the ice-chamber and cooled in its passage, substantially as set forth.

In witness whereof I have hereunto signed my name in the presence of two subscribing witnesses.

PETER A. VOGT.

Witnesses:
J. FRASER,
J. A. DAVIS.